United States Patent

[11] 3,617,578

| [72] | Inventors | James R. Stanford<br>Sugar Land;<br>Paul G. Vogelsang, Jr., Houston, both of Tex. |
|---|---|---|
| [21] | Appl. No. | 879,940 |
| [22] | Filed | Nov. 25, 1969 |
| [45] | Patented | Nov. 2, 1971 |
| [73] | Assignee | Nalco Chemical Company<br>Chicago, Ill.<br>The portion of the term of the patent subsequent to Nov. 11, 1986, has been disclaimed. |

[54] SCALE INHIBITION AND COMPOUNDS THEREFOR
15 Claims, No Drawings

[52] U.S. Cl. .................................................. 210/58, 23/2.7, 252/8.55, 252/180
[51] Int. Cl. ........................................................ C02b 5/06

[50] Field of Search............................................. 21/2.7; 210/58; 252/82, 180, 181, 8.55

[56] References Cited
UNITED STATES PATENTS

| 3,429,824 | 2/1969 | Tate .............................. | 210/58 X |
| 3,462,365 | 8/1969 | Vogelsang et al............. | 210/58 |
| 3,477,956 | 11/1969 | Stanford et al. .............. | 210/58 X |
| 3,487,018 | 12/1969 | Troscinski.................... | 210/58 |

Primary Examiner—Reuben Friedman
Assistant Examiner—Thomas G. Wyse
Attorney—Johnston, Root, O'Keeffe, Keil, Thompson & Shurtleff ABSTRACT: Phosphated oxypropylated amines obtained by reacting polyphosphoric acid or phosphorus pentoxide or mixtures thereof with oxypropylated amines, with or without neutralization, are used as scale inhibitors for calcium, barium and magnesium salts in waters.

SCALE INHIBITION AND COMPOUNDS THEREFOR

BACKGROUND

The invention is concerned with the prevention of scale deposits on solid surfaces in contact with hard water containing hardness scale-forming ions and with the preparation of compounds or compositions which are effective for this purpose. In particular, the invention is concerned with scale prevention in natural brines on ferrous metal walls and other solid surfaces, especially in oil producing and waterflood systems.

Inorganic polyphosphates have long been the most effective and economical sequestering agents used for the prevention of scale deposits in both oil producing and water flood systems. However, due to the problems encountered in feeding inorganic polyphosphates and their incompatibility with many waters, a need for a liquid organic phosphate with good solubility in waters containing hardness ions has become increasingly evident. For this reason, a liquid product with good solubility in produced waters and having the effectiveness and low treating cost of inorganic polyphosphates is needed.

In U.S. Pat. No. 3,462,365 and in U.S. Pat. applications Ser. No. 600,354 filed Dec. 9, 1966, now U.S. Pat. 3,477,956, and Ser. No. 857,239, filed Sept. 11, 1969, organic phosphates have been described which fulfill this need. It would nevertheless be desirable to provide other organic phosphates which are effective for this purpose.

OBJECTS

One of the objects of the present invention is to provide new and useful compounds and compositions which will supply this need.

Another object of the invention is to provide compounds of the type described which are threshold scale inhibitors. Other objects will appear hereinafter.

THE INVENTION

In accordance with the invention it has been found that phosphated oxypropylated amines and/or phosphated oxypropylated hydroxy hydrocarbons, with or without neutralization, are effective scale inhibitors in inhibiting scale deposits from water containing scale-forming chemicals and especially in inhibiting scale produced by natural brines, such as those found in underground formations, as, for example, in oil wells.

In the practice of the invention the phosphated oxypropylated or phosphated oxypropylated hydroxy hydrocarbon, or phosphated mixed oxypropylated amine-hydroxy hydrocarbon, or a neutralization product thereof, is introduced into hard water or brine which is usually contacted with metal or other solid surfaces while maintaining a hardness-ion-precipitation-preventing quantity in the order of 0.5 per 100 parts per million (p.p.m.) of the active effective compound.

The products provided for the purpose of the invention can be described as polyphosphoric acid esters of oxypropylated amines or oxypropylated hydroxy hydrocarbons or mixed oxypropylated amine and hydroxy hydrocarbon. They are preferably prepared by reacting the oxypropylated amine or the oxypropylated hydroxy hydrocarbon or a mixture thereof with polyphosphoric acid and/or phosphorus pentoxide at elevated temperature, preferably in the order of about 50° C. to 175° C., although somewhat higher temperatures on the order of 200° C. to 250° C. can sometimes be used, depending upon the nature of the oxypropylated amine or oxypropylated hydroxy hydrocarbon reactant. In the early stages, the reaction is exothermic and care must be taken to control the temperature. The reaction time is preferably at least about 30 minutes. The reaction may be conducted for a longer period, however, e.g., up to 3 to 5 hours, to assure complete reaction. If desired, a catalyst, such as boron trifluoride etherate complex, may be used. When using polyphosphoric acid, the oxypropylated amine or the oxypropylated hydroxy hydrocarbon or mixture thereof can be added to the polyphosphoric acid liquid. Conversely, the polyphosphoric acid can be added to the oxypropylated amine or the oxypropylated hydroxy hydrocarbon or to a mixture of the oxypropylated amine and oxypropylated hydroxy hydrocarbon.

The resultant reaction produce may be used as is, or it may be converted to a salt by partial to complete neutralization with an alkaline substance such as, for example, potassium or sodium hydroxide, potassium or sodium carbonate, ammonia, or a basic amino compound, e.g., tetramethyl ammonium hydroxide, methylamine, ethylamine, diethylamine, triethanolamine, diethanolamine, triethyl amine, ethylene diamine, diethylene triamine, pyridine, morpholine or other amine. The amine should preferably be a water soluble amine or at least one that does not destroy solubility in water.

The amines which are oxypropylated can be of any type susceptible to oxyalkylation with propylene oxide. Examples of such amines are ethylene diamine; 1,2-propylene diamine; 1,3-propylene diamine; 1,2-butylene diamine; dipropylene triamine; diethylene triamine; triethylene tetramine; tetraethylene pentamine, 1,6-hexane diamine; $C_8$, $C_{10}$, $C_{12}$, $C_{14}$, $C_{16}$ and $C_{18}$ diamines or mixtures thereof derived from animal and vegetable oils, e.g., cocodiamine; diethanol-amine, triethanol amine; still residues obtained in the manufacture of triethanolamine; aminoethylethanolamine and other amines containing reactive hydrogen atoms, preferably at least two reactive hydrogen atoms. They can be monoamines or polyamines. The amines usually employed for the purpose of the invention contain one to six nitrogen atoms and where the amines have alkylene groups connecting two or more nitrogen atoms such alkylene groups contain two to six carbon atoms.

The hydroxyhydrocarbons which can be oxypropylated are, for example, glycerine, sorbitol, mannitol, triemethylolpropane, erythritol, arabitol, xylitol, quercitol, inositol, mono-, di-, and tripentaerythritol, diethylene glycol, dipropylene glycol, and other polyols; monohydric alcohols containing one to 18 carbon atoms; mixed 6–10 carbon atom alcohols; and alkyl phenols containing four to 12 carbon atoms in the alkyl group or groups, preferably nonyl phenol or dinonyl phenol or mixtures thereof.

The oxypropylation is carried out in a conventional manner, for example, usually by adding the desired amount of 1,2-propylene oxide gradually to the amine or hydroxy hydrocarbon or mixture thereof in the presence of a small amount of alkali metal hydroxide catalyst and at temperatures of 120° C. to 140° C. and continuing the heating until the desired reaction has occurred. For example, 4 moles of 1,2-propylene oxide can be added to ethylene diamine or to propylene diamine to produce a diamine containing four hydroxypropyl groups

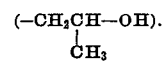

The extent of oxypropylation can be increased by increasing the number of moles of propylene oxide and, in some cases, it is desirable to use as many as 30 moles of propylene oxide per mole of amine and/or hydroxy hydrocarbon. It will be understood that mixtures of oxypropylated amines and/or oxypropylated hydroxy hydrocarbons as well as the individual oxypropylated amines or oxypropylated hydroxy hydrocarbons can be employed in preparing the phosphate esters. Hence, the products can consist of mixed phosphate esters and mixtures of phosphate esters of the oxypropylated compounds.

The resultant phosphate esters have an average of at least one and up to all of the free hydroxyls replaced by phosphate ester groups derived from polyphosphoric acid or phosphorus pentoxide, said phosphate ester groups consisting essentially of one or both of a member selected from the group consisting of

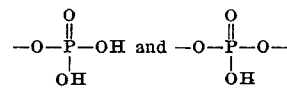

As previously indicated, the compounds provided by the invention include not only the free esters but also the salts of the esters derived by the partial to complete neutralization of the phosphate ester groups.

The invention will be further illustrated but is not limited by the following examples in which the quantities are stated in parts by weight unless otherwise indicated.

EXAMPLE I 76.5 parts of an oxypropylated propylene diamine made by adding 3.5 pounds of 1,2-propylene oxide to 1.1 pounds of propylene diamine was added to the reaction vessel and heated to 50° C. 175 parts of polyphosphoric acid was added gradually with agitation while allowing the temperature of the reaction mixture to increase to 125°–130° C. After the addition of the polyphosphoric acid was complete, the reaction mixture was held at 125°–130° C. for 30 minutes. It was then cooled to below 100° C. and 200 parts of water added.

EXAMPLE II

The procedure was the same as in example I except that 225 parts of polyphosphoric acid was used.

EXAMPLE III

The procedure was the same as in example I except that 350 parts of polyphosphoric acid was used.

EXAMPLE IV

The EXAMPLE was the same as in example I except that 86 parts of oxypropylated glycerine made by adding 2.5 pounds of 1,2-propylene oxide to 1 pound of glycerine was used in place of the oxypropylated propylene diamine.

EXAMPLE V

The procedure was the same as in example IV except that 225 parts of polyphosphoric acid was used.

EXAMPLE VI

The procedure was the same as in example IV except that 350 parts of polyphosphoric acid was used.

EXAMPLE VII

The procedure was the same as in example I except that 77 parts of oxypropylated diethylenetriamine made by adding 2.4 pounds of 1,2-propylene oxide to 1 pound of diethylenetriamine was substituted for oxypropylated propylene diamine.

EXAMPLE VIII

The procedure was the same as in example VII except that 225 parts of polyphosphoric acid was employed.

EXAMPLE IX

The procedure was the same as in example VII except that 350 parts of polyphosphoric acid was employed.

EXAMPLE X

The procedure was the same as in example I except that 208 parts of oxypropylated cocoamine (Formonyte 601) made by adding 0.7 pound of 1,2-propylene oxide to 1 pound of said cocoamine was substituted for the oxypropylated propylene diamine.

EXAMPLE XI

The procedure was the same as in example X except that 225 parts of polyphosphoric acid was used.

EXAMPLE XII

The procedure was the same as in example X except that 350 parts of polyphosphoric acid was used.

EXAMPLE XIII

An oxypropylated cocodiamine (Formonyte 801) was prepared by adding 3.5 pounds of 1,2-propylene oxide to 5 pounds of said diamine. 175 parts of polyphosphoric acid was added to a reaction flask and heated to 50° C. To this there was then slowly added a mixture of 143 parts of said oxypropylated diamine and 150 parts of dimethylformamide while allowing the reaction temperature to increase to 125°–130° C. After the addition was completed the reaction mixture was held at 125°–130° C. for 30 minutes. It was then cooled below 100° C. and 50 parts of water added.

EXAMPLE IV

The procedure was the same as in example XIII except that 225 parts of polyphosphoric acid was used and 143 parts of the oxypropylated diamine was mixed with 75 parts of the acetate of ethylene glycol monomethylether. The product was added to 125 parts of water.

EXAMPLE XV

The procedure was the same as in example XIV except that 350 parts of polyphosphoric acid was used.

EXAMPLE XVI

The procedure was the same as in example I except that 73 parts of oxypropylated ethylene diamine prepared by adding 5 pounds of 1,2-propylene oxide to 1.3 pounds of ethylene diamine was substituted for the oxypropylated propylene diamine.

EXAMPLE XVII

The procedure was the same as in example XVI except that 225 parts of polyphosphoric acid was employed.

EXAMPLE XVIII

The procedure was the same as in example XVI except that 350 parts of polyphosphoric acid was employed.

EXAMPLE XIX

The procedure was the same as in example I except that 69 parts of a triethanolamine residue (Amine N–1) was oxypropylated with 1.1 pounds of 1,2-propylene oxide per 2.9 pounds of said residue and 69 parts of the resultant oxypropylated product was substituted for the oxypropylated propylene diamine.

EXAMPLE XX

The procedure was the same as in example XIX except that 350 parts of polyphosphoric acid was used.

EXAMPLE XXI

The procedure was the same as in example XIX except that 525 parts of polyphosphoric acid was used.

EXAMPLE XXII

The procedure was the same as in example I except that 88.5 parts of oxypropylated triethanolamine residue prepared by adding 1.8 pounds of 1,2-propylene oxide to 2.2 pounds of triethanolamine residue (Amine N–1) was substituted for the oxypropylated propylene diamine.

EXAMPLE XXIII

The procedure was the same as in example XXII except that 225 parts of polyphosphoric acid was used.

EXAMPLE XXIV

The procedure was the same as in example XXII except that 350 parts of polyphosphoric acid was used.

EXAMPLE XXV

The procedure was the same as in example XXII except that 525 parts of polyphosphoric acid was used.

EXAMPLE XXVI

The procedure was the same as in example I except that 108 parts of oxypropylated triethanolamine residue prepared by adding 4.5 pounds of 1,2-propylene oxide to 3.3 pounds of triethanolamine residue (Amine N-1) was substituted for the oxypropylated propylene diamine.

EXAMPLE XXVII

The procedure was the same as in example XXVI except that 225 parts of polyphosphoric acid was used.

EXAMPLE XXVIII

The procedure was the same as in example XXVI except that 350 parts of polyphosphoric acid was used.

EXAMPLE XXIX

The procedure was the same as in example XXVI except that 525 parts of polyphosphoric acid was used.

EXAMPLE XXX

The procedure was the same as in example I except that 84 parts of oxypropylated dipropylenetriamine prepared by adding 4.4 pounds of 1,2-propylene oxide to 2 pounds of dipropylenetriamine was substituted for the oxypropylated propylene diamine.

EXAMPLE XXXI

The procedure was the same as in example XXX except that 225 parts of polyphosphoric acid was used.

EXAMPLE XXXII

The procedure was the same as in example XXX except that 350 parts of polpyhosphoric acid was used.

EXAMPLE XXXIII

The procedure was the same as in example XXX except that 525 parts of polyphosphoric acid was used.

The phosphated esters were evaluated as scale inhibitors by adding them in various amounts to brines containing scale forming chemicals, heating the brine for a predetermined period and then determining the amount of scale forming chemicals retained in solution.

A brine-containing calcium carbonate was prepared by adding to distilled water 5,180 milligrams per liter (mg./l) $NaHCO_3$, 22,200 mg./l NaCl, 6mg./l $Na_2SO_4$, 366 mg./l $MgCl_2 \cdot 6H_2O$, and 2,000 mg./l $CaCl_2$. The water was sparged with carbon dioxide for 30 minutes before the salts were added and again for 30 minutes after the addition of the salts. This composition is hereinafter referred to as Brine A.

To prepare a brine for testing against calcium sulfate, two separate brines were prepared. The first, Brine B, was made by dissolving 7.5 grams of sodium chloride and 8.33 grams of calcium chloride in distilled water sufficient to make one liter. The second, Brine C, was made by dissolving 7.5 grams of sodium chloride, plus 10.66 grams $Na_2SO_4$ in distilled water sufficient to make one liter. These two brines were then mixed in equal parts and the tests were carried out with the addition of various proportions of the chemicals to be tested. These tests were made at various temperatures over predetermined periods of time. The amount of calcium sulfate in solution was determined at the end of each test. Some tests were made under static conditions and others with agitation.

The following examples illustrate the results obtained.

EXAMPLE XXXIV

In this test Brine A was used at a temperature of 160° F. for 24 hours in an unseeded static system, i.e., without agitation.

A blank or control containing no added chemical had a calcium carbonate content of 4,300 mg./l at the beginning of the test and 2,700-2,800 mg./l at the end of the test. All of the calcium carbonate was retained by the addition of 5 p.p.m. of each of the compositions in examples I to XI. 4,100 mg./l of calcium carbonate was retained by adding 5 p.p.m. of the composition of example XII. The addition of 3 p.p.m. of the compositions of examples I to III, and V to IX caused the retention of all of the calcium carbonate. The addition of 3 p.p.m. of the compositions of examples IV and X caused the retention of 4,200 mg./l of calcium carbonate.

EXAMPLE XXXV

The procedure was the same as in example XXXIV except that the test was run for 20 hours.

The blank or control containing no added chemical had a calcium carbonate content of 4,300 mg./l at the beginning of the test and 3,000 mg./l at the end of the test. All of the calcium carbonate was retained by the addition of 4 p.p.m. of the compositions of examples XIII and XV to XXXIII. 4,200 mg./l was retained by the addition of 5 p.p.m. of the composition of example XIV. All of the calcium carbonate was also retained by the addition of 3 p.p.m. of the compositions of examples XIII, XIV to XXX, XXXII and XXXIII. 4,100 mg./l of the calcium carbonate was retained by 3 p.p.m. of the composition of example XXXI.

EXAMPLE XXXVI

A mixture of 50 ml. of Brine B and 50 ml. of Brine C was used in these tests which were carried out at 160° F. for 30 hours in a static system. A control or blank before precipitation retained 4,000 mg./l of calcium sulfate, calculated as calcium carbonate. After the test it retained 2,800 mg./l. The compositions of examples I to X, at a dosage of 1.5 p.p.m. caused retention of all of the calcium sulfate. Examples XI and XII at the same dosage caused retention of 3,100 mg./l of the calcium sulfate.

At a dosage of 1 p.p.m. the compositions of examples I to III and V to IX caused retention of all of the calcium sulfate. At a dosage of 0.5 p.p.m. the compositions of examples VII to IX caused a retention of all of the calcium sulfate. At a dosage of 0.25 p.p.m. the compositions of examples VIII and IX caused retention of all of the calcium sulfate.

EXAMPLE XXXVII

The procedure was the same as in example XXXVI. A control or blank before precipitation retained 4,000 mg./l of calcium sulfate, calculated as calcium carbonate. After the test it retained 2,700 mg./l. The compositions of examples XIV to XXIX at a dosage of 1 p.p.m. caused a retention of all of the calcium sulfate. At the same dosage compositions of examples XIII, XIV, XXX to XXXIII caused retention of 3,300 mg./l, 2,900 mg./l, 3,300 mg./l, 3,000 mg./l, 3,700 mg./l, and 3,200 mg./l, respectively.

The compositions of examples XIX to XXV and XXVII to XXIX caused retention of all of the calcium sulfate at a dosage of 0.5 p.p.m. and the compositions of examples XIX, XX and XXIV caused retention of all of the calcium sulfate at a dosage of 0.25 p.p.m.

It is evident from the foregoing test results that the deposition of calcium carbonate and calcium sulfate can be exhibited by a very small dosage, sometimes even as low as 0.25 p.p.m. and in practically all cases at 5 p.p.m. The use of such small dosages up to about 9 p.p.m. is usually referred to as a "threshold" treatment. While the dosage of the phosphate ester will normally be within the range of 0.5 to 100 p.p.m. certain types of uses may require higher dosages, even as high as 200-500 p.p.m.

In general, it is preferable that there be at least two hydroxypropyl groups on the nucleus of the compound (amine and/or hydroxy hydrocarbon) which is reacted with the polyphosphoric acid. In some cases, one or more hydroxy propyl groups can be attached to an amine and one or more hydroxy propyl groups can be attached to a polyol, monohydric alcohol and/or an alkyl phenol so that the product obtained by the reaction with the polyphosphoric acid is a mixed ester or a mixture of esters.

While the phosphate esters in the examples have been prepared by using a commercial grade of polyphosphoric acid also called "115 percent phosphoric acid," it will be understood that the reaction can also be carried out with phosphorus pentoxide or with a mixture of polyphosphoric acid and phosphorus pentoxide.

The compositions of the invention are especially effective in the inhibition of scaling on metal or other solid surfaces by calcium, barium and magnesium slats, especially by calcium sulfate, barium sulfate, and calcium carbonate. They are useful in industry to prevent deposits of these scale-producing compounds on metal surfaces of pumps, pipes, valves, tanks, and the like when waters containing the scale-producing compounds (or precursors thereof, e.g., calcium bicarbonate) are treated in the concentrations aforesaid, i.e., 0.5 to 100 parts per million. Places where scale buildup is most likely to become troublesome are those in the liquid handling systems wherein there is a change in fluid pressure, a change in fluid temperature, or a change in fluid flow rate.

The invention has utility in the prevention of similar scale deposits occurring in closed and once-through cooling systems where hard water is employed.

The compounds also have utility in boiler feedwaters and in waters charged to certain desalinization equipment where scale deposition is a problem.

The invention can also be used in the prevention of scale deposits in certain effluent and disposal waters, particularly where other materials used in the prevention of such deposits may constitute a pollution problem.

In a number of oil fields in west Texas and other areas, water floods have been established in which waters incompatible with the connate waters were used for injection. This occurs when a good source of compatible water is not available. Most of these floods are using a high sulfate water to flood a formation which has a high calcium content water. As the waters reach the producing well they mix, and a calcium sulfate deposition occurs, either in the formation at the well bore or in the producing equipment. This requires the removal of the tubing, rods and pump for cleaning, and a fracturing job if the formation is plugged, which is the case most of the time. By the practice of the present invention the formation of scale in the producing equipment and underground formation can be reduced or prevented.

Similarly, the invention is applicable to the treatment of water supply wells. The phosphate esters can also be added directly to the input well of a waterflood system consisting of one or more input wells and one or more producing wells.

We claim:

1. A process for preventing scale deposits of calcium, barium or magnesium salts or mixtures thereof from water containing said scale-forming chemicals which comprises adding to said water an effective scale inhibiting amount of a phosphate ester of at least one oxypropylated amine in which the phosphate ester groups consist essentially of one or both of a member selected from the group consisting of

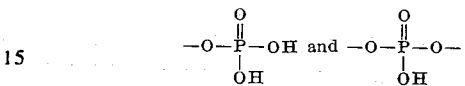

2. A process as claimed in claim 1 in which said phosphate ester is obtained by reacting said oxypropylated amine with a compound from the group consisting of polyphosphoric acid, phosphorus pentoxide, and mixtures of polyphosphoric acid and phosphorus pentoxide.

3. A process as claimed in claim 1 wherein said amount is 0.5 and 100 parts per million parts of said water.

4. A process as claimed claim 1 in which said ester is at least partially in the form of a salt thereof.

5. A process as claimed in claim 1 wherein said water is a natural hard water or brine.

6. A process as claimed in claim 1 in which said water is a cooling water.

7. A process as claimed in claim 1 in which said water is a boiler feedwater.

8. A process as claimed in claim 1 in which said water is a disposal water.

9. A process as claimed in claim 1 in which said water is in an underground oil producing formation.

10. A process as claimed in claim 1 in which said phosphate ester is added to water used in a water flood system to increase the production of oil wells.

11. A process as claimed in claim 1 in which said oxypopylated amine contains two to six nitrogen atoms connected by alkylene groups containing two to six carbon atoms.

12. A process as claimed in claim 1 in which said oxypropylated amine is an oxypropylated polyamine having the amino nitrogen atoms connected by an alkylene chain of two to 12 carbon atoms.

13. A process as claimed in claim 12 in which said polyamine is propylene diamine.

14. A process as claimed in claim 12 in which said polyamine is dipropylene triamine.

15. A process as claimed in claim 1 in which said oxypropylated amine is an oxypropylated hydroxy amine containing not more than 30 moles of propylene oxide per mole of amine.

* * * * *